(12) United States Patent
Flat et al.

(10) Patent No.: US 7,897,673 B2
(45) Date of Patent: Mar. 1, 2011

(54) FLEXIBLE HIGH THERMOMECHANICAL STRESS-RESISTANT AND FIREPROOF HALOGEN-FREE THERMOPLASTIC COMPOSITIONS

(75) Inventors: Jean-Jacques Flat, Goupillieres (FR); Philippe Blondel, Bernay (FR); David Meslet, Bernay (FR)

(73) Assignee: Arkema France, Colombes (FR)

( * ) Notice: Subject to any disclaimer, the term of this patent is extended or adjusted under 35 U.S.C. 154(b) by 23 days.

(21) Appl. No.: 12/303,174

(22) PCT Filed: Jun. 1, 2007

(86) PCT No.: PCT/FR2007/051365
§ 371 (c)(1),
(2), (4) Date: Jun. 16, 2009

(87) PCT Pub. No.: WO2007/141449
PCT Pub. Date: Dec. 13, 2007

(65) Prior Publication Data
US 2009/0253836 A1    Oct. 8, 2009

(30) Foreign Application Priority Data

Jun. 2, 2006  (FR) .................................... 0652014

(51) Int. Cl.
*C08K 3/32* (2006.01)
*C08K 3/34* (2006.01)
(52) U.S. Cl. ......... 524/416; 524/126; 524/127; 524/133; 524/140; 524/141; 524/424; 524/450

(58) Field of Classification Search ............... 524/126, 524/127, 133, 140, 141, 416, 424, 450
See application file for complete search history.

(56) References Cited

U.S. PATENT DOCUMENTS

| 3,963,799 | A | 6/1976 | Starkweather, Jr. |
| 5,194,319 | A | 3/1993 | Onaka et al. |
| 6,875,520 | B2 * | 4/2005 | Court et al. ............... 428/475.5 |
| 7,235,604 | B2 * | 6/2007 | Blondel et al. ............. 525/140 |
| 2004/0054054 | A1 | 3/2004 | Blondel et al. |

FOREIGN PATENT DOCUMENTS

EP    0 629 678    12/1994

* cited by examiner

*Primary Examiner* — Peter Szekely
(74) *Attorney, Agent, or Firm* — Thomas F. Roland

(57) ABSTRACT

The invention concerns flexible high thermomechanical stress-resistant and fire retardant halogen-free thermoplastic compositions, comprising a polyamide block-graft copolymer consisting of a trunk and on average at least one polyamide graft, wherein the grafts are bound to the trunk by the residues of an unsaturated monomer (X) having a function capable of reacting with a polyamide at the amine-terminal, the unsaturated monomer residues (X) being bound on the trunk by grafting or copolymerization from the double bond thereof. The invention is characterized in that the compositions comprise a mixture: 50 to 70 wt. % of polyamide block copolymer, 25 to 35 wt. % of a flame-retardant agent selected among ammonium phosphates, phosphinates, pyrophosphates, and polyphosphates, about 2 wt. % of zeolite, or hydrotalcitemolecular sieves. Said compositions are particularly useful for making electric cables, electric components, for molding electrotechnical housings, or for making coating layers or thermal protection sleeves for fluid transfer lines in the automotive industry.

18 Claims, No Drawings

FLEXIBLE HIGH THERMOMECHANICAL STRESS-RESISTANT AND FIREPROOF HALOGEN-FREE THERMOPLASTIC COMPOSITIONS

This application claims benefit, under U.S.C. §119 or §365 of French Application Number FR 06.52014, filed Jun. 2, 2006; and PCT/FR2007/051365 filed Jun. 1, 2007.

FIELD OF THE INVENTION

The present invention relates to flame-retarded flexible thermoplastic compositions of high thermomechanical strength, based on functionalized polyolefins grafted with polyamide units, containing at least one flame retardant, based more particularly on ammonium polyphosphates, and a zeolite, and containing no halogen compounds, phosphorus plasticizer or red phosphorus.

These compositions are useful in cabling for the purposes of insulating and protecting electrical cables and optical fibers and for the manufacture of electrical components such as electrical connectors, and also in electrical engineering for molding articles such as cases.

BACKGROUND OF THE INVENTION

Thermoplastic polymers such as polyethylenes, polyamides or blends thereof are good electrical insulators and are easy to employ. They are used to make cases and electrical connectors and also cable coatings. Electrical systems may be the origin of short circuits and may catch fire, and they may also be contacted with a flame and hence catch fire and propagate the fire along the cable routes. A variety of additives exist for making these materials nonflammable, some of said additives being based on halogenated products, and others being halogen-free. The use of halogenated additives is increasingly being banned for reasons of ecotoxicology and toxicology (toxicity and corrosiveness of the vapors emitted during fires).

According to the UL 94 flame propagation tests in accordance with the standard ISO 1210, the V0 classification is the best classification, corresponding to a material which is difficult to ignite and does not produce flaming droplets during the test.

For the V1 classification, the material is easier to ignite but does not produce flaming droplets during the test. As far as the V2 classification is concerned, in addition to the greater ease of ignition than for V0, flaming droplets may be produced during the test.

Materials which are even more flammable are given the label NC (not classified).

Patent EP 629 678 describes thermoplastic alloys comprising blends of polyamide and polypropylene, to which a zeolite and ammonium polyphosphate (dehydrating agent) are added to make them flame retardant. The blends of polyamide and polyolefin are composed (by weight) of 57% of polyamide 6 (PA 6), 33% of a propylene homopolymer, and 10% of a polypropylene grafted with maleic anhydride and then condensed with a monoamino polyamide oligomer. 30 parts (by weight) of ammonium polyphosphate (APP) and one part of zeolite were added to 69 parts of the aforementioned mixtures, after which test specimens with a thickness of 3.2 mm were produced by injection molding. These test specimens were subjected to the UL 94 flame propagation tests in accordance with standard ISO 1210, the classification obtained being V0. V0 is the best classification according to this test. These blends, which are composed of a PA matrix, do not contain phosphorus plasticizer, and there is no indication of any mechanical property such as, in particular, elongation at break.

Patent EP 704 489 describes compositions composed of a polyamide matrix containing, dispersed therein, crosslinked polyolefin nodules and flame retardants selected from magnesium hydroxide, decabromodiphenyl ether, melamine cyanurate, and pentaerithritol. These compositions are useful for sheathing electrical cables. They contain no polyphosphates, no phosphorus plasticizer, and no zeolite.

However, the fire resistance performance of these prior-art compositions is generally obtained at the expense of the ductility of the materials (considerable loss in elongation at break, fragile impact behavior at ambient temperature). Moreover, the thermal stability of these materials is found to be inadequate. By thermal stability is meant the retention of mechanical properties (and more particularly elongation at break) after various forms of thermal aging (for example, 1 week at 120° C. in hot air).

The Applicant's document EP 1 375 594 describes compositions rendered flame retardant without halogen compounds and comprising, by weight, the total being 100 parts:

50 to 75 parts of a blend of polyamide (A) and polyolefin (B), comprising (i) a high density polyethylene (HDPE) and (ii) a blend of a polyethylene (C1) and a polymer (C2) selected from elastomers, very low density polyethylenes, and ethylene copolymers, the blend (C1)+(C2) being co-grafted by an unsaturated carboxylic acid, 25 to 50 parts of a mixture comprising:
0.1 to 48.8 parts of a flame retardant, of ammonium polyphosphate type,
0.1 to 30 parts of a phosphorus plasticizer,
0.1 to 10 parts of a zeolite.

These compositions exhibit a V0 or V1 classification according to the UL 94 test, when the fire test is conducted on test specimens with a thickness of 1.6 mm, and their elongation at break, measured according to ISO R 527-1B, exceeds 100%.

The blend of (A)+(B) includes 60% to 70% by weight of polyamide (A), which constitutes its matrix.

These formulations contain a phosphorus plasticizer, the atomic element phosphorus being known to contribute to the flame retardance of materials. On the other hand, these plasticizers, being small molecules, have an observed tendency to depart the resulting material (to exude), which is unacceptable for the applications intended. New formulations have therefore now been found which are not plasticized (and hence are nonexuding) but which nevertheless possess the same level of flame retardance.

Moreover, the halogen-free flame retarding of functionalized polyolefins is well known, especially for cabling applications. It involves introducing very large amounts (60% to 65% by weight) of hydrate fillers such as aluminum trihydrate (ATH) or magnesium dihydroxide (MDH) in order to provide the expected levels of flame retardance. The transposition of flame retardance formulas of this kind to PA-grafted ethylene-alkyl (meth)acrylate-maleic anhydride copolymer materials, of the type of those described in document WO 02/28959 to the Applicant, which relates to a blend of a graft polymer containing polyamide blocks and composed of a polyolefin backbone and on average at least one polyamide graft, and of a flexible polyolefin, leads to a catastrophic loss of mechanical properties in the composition, especially as regards elongation at break (value <100%).

Moreover, a PA graft copolymer of this kind exhibits no flame propagation resistance (UL94 test: NC=not classified for Lotader® 3410-g-$PA_6$).

However, certain target applications for these materials (cabling, electrical and electrotechnical components, automotive) require a combination of such properties.

SUMMARY OF THE INVENTION

The objective of the invention is to find compositions, based on polyamide-grafted, functionalized polyolefins and flame-retarded without halogen, that allow a material to be produced that is highly performing in terms of flame propagation resistance (according to the UL94 test) but that also possesses high-level mechanical and thermomechanical properties, and also high thermal stability and satisfactory rheology (no excessive viscosity increase, high MFI (Melt Flow Index)), without producing exudation on the materials obtained.

References to high-level mechanical and thermomechanical properties are references to a material possessing a flexural modulus of less than or equal to 400 MPa at ambient temperature and an elastic modulus, measured by dynamic mechanical analysis (DMA), of at least 0.5 MPa at 150° C. DMA analysis consists in subjecting the material to be analyzed to dynamic (1 Hz) tension over a range of temperatures from −100° C. up to 250° C., at a rate of 3° C./min, and recording the elastic modulus and loss values and also their ratio, corresponding to the tangent of the loss angle.

Similarly, the material is considered to exhibit high thermal stability when it retains of the order of 70% of its initial mechanical properties of elongation at break and breaking stress after aging under thermooxidative conditions.

The rheology of the material in question is considered satisfactory, moreover, when it is compatible with the typical processes for converting materials from compositions according to the invention (extrusion, injection molding, etc.).

This objective is obtained according to the invention by flame-retarded flexible thermoplastic compositions, their flexibility implying a flexural modulus of not more than 400 MPa, and having a high thermomechanical strength, and containing no halogen compound, comprising a graft copolymer containing polyamide blocks and composed of a polyolefin backbone and on average at least one polyamide graft, in which the grafts are attached to the backbone by the radicals of an unsaturated monomer (X) having a function capable of reacting with an amine-terminal polyamide, the radicals of the unsaturated monomer (X) being fixed to the backbone by grafting or copolymerization from its double bond, wherein said composition comprises, in a mixture:
  50% to 70% by weight of the graft copolymer containing polyamide blocks,
  25% to 35% by weight of a flame retardant selected from ammonium phosphates, phosphinates, pyrophosphates, and polyphosphates,
  approximately 2% by weight of molecular sieve, such as a zeolite, or of hydrotalcite(s).

Preferably, according to the invention, the polyolefin backbone containing X of the graft copolymer containing polyamide blocks is selected from ethylene-maleic anhydride and ethylene-alkyl (meth)acrylate-maleic anhydride copolymers.

Preferably there are on average at least 1.3 moles of X attached to the polyolefin backbone.

In particular the polyamide graft has a molar mass Mn of between 1000 and 5000 g/mol and preferably between 2000 and 3000.

More particularly the flame retardant is ammonium polyphosphate.

According to one preferred embodiment the zeolites are 3A, 4A, 5A, 10X, and 13X zeolites.

The flame-retarded thermoplastic compositions according to the invention may further comprise, in a mixture, melamine cyanurate and/or pentaerythritol.

Moreover, it would be no departure from the scope of the present invention to replace some or all of the polyolefin backbone and/or of the polyamide grafts by their respective mixture with nanofillers (such as, in particular, nanoclays or carbon nanotubes), said mixtures being known by the person skilled in the art under the term "nanocomposites".

The flame-retarded compositions according to the invention find advantageous use for the manufacture of cables, and also of electrical components such as electrical connectors, or in electrical engineering for molding articles such as cases.

However, these compositions may also be used to produce protective layers or thermal protection sleeves for fluid transfer lines (or pipes) in the automotive industry (especially fuel or coolant).

DETAILED DESCRIPTION OF THE INVENTION

The graft copolymer containing polyamide blocks may be obtained by reacting an amine-terminal polyamide with the residues of an unsaturated monomer X which is attached by grafting or copolymerization to a polyolefin backbone.

This monomer X may be, for example, an unsaturated epoxide or an unsaturated carboxylic anhydride. The unsaturated carboxylic anhydride may be selected, for example, from maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic, and x-methylbicyclo[2.2.1]hept-5-ene-2,2-dicarboxylic anhydrides.

It is advantageous to use maleic anhydride. It would not be a departure from the scope of the invention to replace some or all of the anhydride by an unsaturated carboxylic acid such as, for example, (meth)acrylic acid.

As far as the polyolefin backbone is concerned, a polyolefin is defined as being an alpha-olefin or diolefin homopolymer or copolymer, such as, for example, a homopolymer or copolymer of ethylene, propylene, but-1-ene, oct-1-ene or butadiene. Examples may include:
  homopolymers and copolymers of polyethylene, especially LDPE, HDPE, LLDPE (linear low density polyethylene), VLDPE (very low density polyethylene), and metallocene polyethylene;
  homopolymers or copolymers of propylene;
  ethylene/alpha-olefin copolymers such as ethylene/propylene, EPR (ethylene-propylene rubber) and ethylene/propylene/diene (EPDM) copolymers;
  styrene/ethylene-butene/styrene (SEBS), styrene/butadiene/styrene (SBS), styrene/isoprene/styrene (SIS), and styrene/ethylene-propylene/styrene (SEPS) block copolymers;
  copolymers of ethylene with at least one product selected from the salts or esters of unsaturated carboxylic acids, such as alkyl (meth)acrylate (for example, methyl acrylate), or the vinyl esters of saturated carboxylic acids, such as vinyl acetate, it being possible for the proportion of comonomer to be as much as 40% by weight.

The polyolefin backbones to which the residues of X are attached are advantageously polyethylenes grafted with X or copolymers of ethylene and of X which are obtained, for example, by free-radical polymerization.

As far as the polyethylenes are concerned to which X is grafted, the polyethylene comprises homopolymers or copolymers.

Comonomers may include the following:

- alpha-olefins, advantageously those having 3 to 30 carbon atoms. Examples have been given earlier on above. These alpha-olefins may be used alone or in a mixture of two or more than two;
- esters of unsaturated carboxylic acids, such as, for example, alkyl(meth)acrylates, it being possible for the alkyls to have up to 24 carbon atoms; examples of alkyl acrylate or methacrylate are more particularly methyl methacrylate, ethyl acrylate, n-butyl acrylate, isobutyl acrylate, and 2-ethylhexyl acrylate;
- vinyl esters of saturated carboxylic acids, such as, for example, vinyl acetate or vinyl propionate;
- dienes such as, for example, 1,4-hexadiene;
- the polyethylene may comprise two or more of the above comonomers.

The polyethylene, which may be a blend of two or more polymers, advantageously comprises at least 50% and preferably 75% (in mols) of ethylene, and its density may be between 0.86 and 0.98 g/cm$^3$. The MFI (viscosity index at 190° C., 2.16 kg) is advantageously between 20 and 1000 g/10 min.

Examples of possible polyethylenes include the following:
low density polyethylene (LDPE)
high density polyethylene (HDPE)
linear low density polyethylene (LLDPE)
very low density polyethylene (VLDPE)
polyethylene obtained by metallocene catalysis
EPR (ethylene-propylene rubber) elastomers
EPDM (ethylene-propylene-diene) elastomers
blends of polyethylene with an EPR or an EPDM
ethylene-alkyl(meth)acrylate copolymers containing up to 60% by weight of (meth)acrylate, and preferably 2% to 40%.

Grafting is an operation which is known per se.

With regard to the copolymers of ethylene and X, in other words those in which X is not grafted, they are copolymers of ethylene, X, and, optionally, another monomer, which may be selected from the comonomers given above for the copolymers of the ethylene that are to be grafted.

It is advantageous to use ethylene-maleic anhydride and ethylene-alkyl(meth)acrylate-maleic anhydride copolymers. These copolymers contain from 0.2% to 10% by weight of maleic anhydride, from 0% to 40% and preferably 5% to 40% by weight of alkyl(meth)acrylate. Their MFI is between 5 and 100 (190° C.-2.16 kg). The alkyl (meth)acrylates have already been described earlier on above. The melting temperature is between 80 and 120° C.

There are advantageously on average at least two mols of X per chain attached to the polyolefin backbone, and preferably from 2 to 5. The skilled worker is easily able to determine, by FTIR analysis, the number of these mols of X. For example, if X is maleic anhydride and the $M_w$ of the polyolefin is 95000 g/ml, it has been found that this corresponds to a proportion of anhydride of at least 1.5% by weight of the entirety of the polyolefin backbone containing X, and preferably from 2.5% to 4%. These values, in combination with the mass of the amine-terminal polyamides, determine the proportion of polyamide and of backbone in the graft copolymer containing polyamide blocks.

As far as the amine-terminal polyamide is concerned, a polyamide means the products of condensation:

- of one or more amino acids, such as aminocaproic, 7-aminoheptanoic, 11-aminoundecanoic, and 12-aminododecanoic acids, and of one or more lactams such as caprolactam, oenantholactam, and lauryllactam;
- of one or more salts or mixtures of diamines such as hexamethylenediamine, dodecamethylenediamine, meta-xylylenediamine, bis-p-aminocyclohexylmethane, and trimethylhexamethylenediamine, with dibasic acids such as isophthalic, terephthalic, adipic, azelaic, suberic, sebacic, and dodecanedicarboxylic acids;
- or of mixtures of two or more monomers, thereby leading to copolyamides.

It is possible to use blends of polyamides. It is advantageous to use PA 6, PA 11, PA 12, copolyamide with 6 units and 11 units (PA 6/11), copolyamide with 6 units and 12 units (PA 6/12), and copolyamide based on caprolactam, hexamethylenediamine, and adipic acid (PA 6/6-6).

The degree of polymerization may vary within wide proportions; depending on its value, the product is a polyamide or a polyamide oligomer. Throughout the remainder of the text, the two expressions will be used synonymously for the grafts.

For the polyamide to have a monoamine termination, it is sufficient to use a chain stopper of formula

in which:

$R_1$ is hydrogen or a linear or branched alkyl group containing up to 20 carbon atoms, $R_2$ is a linear or branched alkyl or alkenyl group having up to 20 carbon atoms, a saturated or unsaturated cycloaliphatic radical, an aromatic radical or a combination of these. The stopper may be, for example, laurylamine or oleylamine.

The amine-terminal polyamide advantageously has a molar mass of between 1000 and 5000 g/mol and preferably between 2000 and 3000.

The preferred amino acid or lactam monomers for the synthesis of the monoamino oligomer according to the invention are selected from caprolactam, 11-aminoundecanoic acid, and dodecalactam. The preferred monofunctional polymerization stoppers are laurylamine and oleylamine.

The above-defined polycondensation takes place according to the commonly known processes, at for example a temperature of between, in general, 200 and 300° C., under vacuum or under an inert atmosphere, with stirring of the reaction mixture. The average chain length of the oligomer is determined by the initial molar ratio between the polycondensable monomer or the lactam and the monofunctional polymerization stopper. For the calculation of the average chain length, it is common to count one molecule of chain stopper for one oligomer chain.

The addition of the monoamino polyamide oligomer to the polyolefin backbone containing X takes place by reaction of an amine function of the oligomer with X. X advantageously carries an acid or anhydride function, thus giving rise to amide to imide linkages.

The addition of the amine-terminal oligomer to the polyolefin backbone containing X is preferably performed in the melt state. In this way it is possible, in an extruder, to knead the oligomer and the backbone at a temperature of generally between 230 and 300° C. The average residence time of the melted material in the extruder may be between 5 seconds and 5 minutes, and preferably between 20 seconds and 1 minute. The efficiency of this addition is evaluated by selective extraction of the free polyamide oligomers, in other words those which have not reacted to form the final graft copolymer containing polyamide blocks.

The preparation of amine-terminal polyamides of this kind, and their addition to a polyolefin backbone containing X, is described in U.S. Pat. No. 3,976,720, U.S. Pat. No. 3,963,799, U.S. Pat. No. 5,342,886, and FR 2 291 225.

The graft copolymers containing polyamide blocks of the present invention are characterized by a nanostructured arrangement with polyamide lamellae having a thickness of between 10 and 50 nanometers.

The proportion of graft copolymer containing polyamide blocks is advantageously from 15% to 50% per 85% to 50%, respectively, of flexible polyolefin.

The blends of the invention are highly resistant to flow at temperatures of at least 80° C. and possibly up to 130° C., which is to say that they do not exhibit breakage under 25 kPa.

The blends of the invention may be prepared by melt-blending in extruders (single-screw or twin-screw), Buss kneaders, Brabender mixers, and, in general, the usual devices for blending thermoplastic polymers, and preferably in corotating twin-screw extruders. The blends of the invention may also comprise free-flow agents such as silica, ethylenebisamide, calcium stearate or magnesium stearate. They may further comprise antioxidants, UV absorbers, mineral fillers, and coloring pigments.

The blends of the invention may be prepared in one step in an extruder. The backbone containing X (for example, an ethylene-alkyl(meth)acrylate-maleic anhydride copolymer) and the amine-terminal polyamide are introduced in the first zones, and then, a number of zones later, the flame retardant is introduced by side feeding. It is also possible to introduce all of the ingredients into the first zone of the extruder.

As far as the flame retardant is concerned, it comprises compounds which are capable, at the time of combustion, of forming acids such as $H_3PO_4$ (orthophosphoric acid), $(HPO_3)_n$ (metaphosphoric acid), and $H_4P_2O_7$ (pyrophosphoric acid). Illustrative examples of such agents include ammonium phosphates, phosphinates, pyrophosphates, and polyphosphates, melamine phosphates, melamine phosphite, piperazine phosphite and diphosphite, guanazole phosphate, melamine pyrophosphate, and piperazine pyrophosphate.

It is advantageous to use ammonium polyphosphates, which are single-chain polymers of general formula $(NH_4)_{n+2}P_nO_{3n+1}$, in which n represents an integer greater than or equal to 2.

The ammonium polyphosphate may be encapsulated in a melamine-based resin. It would not be a departure from the scope of the invention to use a mixture of the aforementioned flame retardants. The flame retardant may be functionalized—for example, it may carry silane functions.

As far as the zeolites are concerned, they are described in ULLMANN'S Encyclopedia of Industrial Chemistry, 1996, 5th edition, Vol. 28, pages 475-504. It is possible to use A, X, Y, L, ZSM or ZM zeolites or else natural zeolites such as chabazite, mordenite, and faujasite. Use is made advantageously of 3A, 4A, 5A, 10X, and 13X zeolites. It would not be a departure from the scope of the invention to use a mixture of these various zeolites.

The zeolites are generally used in the form of a powder of more than 1 μm and preferably between 2 and 50 μm.

It would not be a departure from the scope of the invention to substitute these zeolites by inorganic additives known under the name "acid scavenger" or hydrotalcites. One possible example is DHT 4A from KYOWA Chemical.

With particular advantage, the composition according to the invention may also comprise at least one copolymer of ethylene and a carboxylic acid or ethylenically unsaturated ester comonomer.

This carboxylic acid or ethylenically unsaturated ester comonomer is advantageously present in a proportion of 5 to 40 mol %, preferably from 15 to 35 mol %, based on the total number of mols of the copolymer.

This comonomer may comprise at least one element selected from vinyl acetate (VA), ethyl acrylate (EA), methyl acrylate (MA), n-butyl acrylate (BA), isobutyl acrylate, methyl methacrylate, 2-ethylhexyl acrylate (AE2H or EH), acrylic acid, and methacrylic acid.

Preferably this copolymer of ethylene and a carboxylic acid or ethylenically unsaturated ester comonomer is introduced in proportions which can be up to 20 parts per 100 parts of composition according to the invention.

In addition to the above products, it is possible to add any halogen-free additive which is well known to a person skilled in the art of polyamides, such as melamine cyanurate, pentaerythritol cyanurate, and anti-dropping agents of silicone or fluorinated type. Such additives are introduced in proportions which may be up to 20% by weight of the total composition.

The compositions according to the invention may further comprise at least one additive selected from dyes, pigments, optical brighteners, antioxidants, UV stabilizers, and heat stabilizers.

The compositions of the invention are prepared either by mixing all of the ingredients (copolymer, flame retardant, zeolite), in a "direct" process, or by adding the flame retardant and the zeolite to the blend of copolymer and PA that has already been prepared ("rework" process).

Compounding of the Formulations:

The formulations described below are prepared by compounding using a Coperion Werner and Pfleiderer® ZSK 40 corotating twin-screw extruder ("twin-screw" process, indicated "t-screw" in the table below), whose barrel elements are heated with a flat profile at 240° C.; the rotary speed is 300 rpm, with a throughput of 70 kg/h; the additives are added by side feeding to the melted polymer in barrel 4.

Another compounding process employs a Buss PR46 co-kneader ("co-kneader process" indicated "co-knead" in the table). For this "co-kneader" process, the metal temperature profile is 220/250/250/250/240; the rotary speed of the co-kneader is 280 rpm and the throughput is fixed at 15 kg/h, half of the flame-retardant filler being introduced with the polymers in the first well, and then the second half in the second well, with degassing applied to the third well.

Materials Employed:

Lotader® 3410: terpolymer of ethylene, butyl acrylate (18% by weight) and maleic anhydride (3% by weight), produced by ARKEMA, possessing an MFI (190° C., 2.16 kg, measured by ISO 1133) of 5 g/10 min.

Lotader® 6200: terpolymer of ethylene, ethyl acrylate (6.5% by weight) and maleic anhydride (2.8% by weight), produced by ARKEMA, possessing an MFI (190° C., 2.16 kg, measured by ISO 1133) of 40 g/10 min.

Lotader® 8200: terpolymer of ethylene, ethyl acrylate (6.5% by weight) and maleic anhydride (2.8% by weight), produced by ARKEMA, possessing an MFI (190° C., 2.16 kg, measured by ISO 1133) of 200 g/10 min.

Lotader® 7500: terpolymer of ethylene, ethyl acrylate (17.5% by weight) and maleic anhydride (2.8% by weight), produced by ARKEMA, possessing an MFI (190° C., 2.16 kg, measured by ISO 1133) of 70 g/10 min.

Lotader® 3210: terpolymer of ethylene, butyl acrylate (6% by weight) and maleic anhydride (3% by weight), produced by ARKEMA, possessing an MFI (190° C., 2.16 kg, measured by ISO 1133) of 5 g/10 min.

Evatane® 2403: copolymer of ethylene and vinyl acetate (24% by weight), produced by ARKEMA, possessing an MFI (190° C., 2.16 kg measured by ISO 1133) of 3 g/10 min.

Lotryl® 35BA40: copolymer of ethylene and butyl acrylate (35% by weight), possessing an MFI (190° C., 2.16 kg, measured by ISO 1133) of 40 g/10 min.

Lotryl® 30BA02: copolymer of ethylene and butyl acrylate (30% by weight), possessing an MFI (190° C., 2.16 kg, measured by ISO 1133) of 2 g/10 min.

PA6: polyamide 6 terminated with an amine function, with an Mn of 2500 g/mol as measured by GPC.

Irganox 1098: hindered phenol heat stabilizer produced by CIBA.

Irganox 1010: hindered phenol heat stabilizer produced by CIBA.

Irgafos 168: phosphite heat stabilizer produced by CIBA.

Siliporite® NK10AP: zeolite 4 molecular sieve produced by CECA.

Exolit® AP750: ammonium polyphosphate produced by CLARIANT and possessing a phosphorus content of 21% and a nitrogen content of 12%.

Budit® 3167: ammonium polyphosphate produced by BUDENHEIM and possessing 50% of $P_2O_5$ and 21% of nitrogen.

Phosphlex® 31L: isopropyl phenyl diphenyl phosphate produced by AKZO.

PER: monopentaerythritol produced by CELANESE.

Magnifin H5: magnesium dihydroxide produced by MARTINSWERK.

Magnifin H5 KV: magnesium dihydroxide produced by MARTINSWERK.

Stavinor CA PSE: calcium stearate produced by CECA.

Characterization of the Materials

Production of strips by extrusion: the granules obtained from the "twin-screw" and "co-kneader" synthesis processes are shaped using a ThermoHaake Rheocord System 40 laboratory twin-screw extruder which is equipped with a sheet die and is heated at 210° C., to give strips from which the test specimens needed for characterizing the materials will be cut.

Measurement of the MFI: this is carried out according to standard ISO 1133 under the following conditions (230° C., 2.16 kg) unless otherwise stated.

Measurement of the flow resistance: test specimens cut from the above strips are subjected to a mass corresponding to a pressure of 2 bar in a temperature-regulated oven. The test is rated positive if the test specimen resists this load for 15 minutes, and the maximum temperature withstood is recorded. If the test specimen does not withstand these conditions, a measurement is made of the time after which the test specimen broke.

Elongation break and breaking stress: measured according to standard ISO 527: 93-1BA on test specimens cut from the strips above.

Hardness: measured on the Shore D scale in accordance with standard ISO 868.

Limiting oxygen index (LOI): measured in accordance with standard ISO 4589.

Flame propagation resistance: measured by the UL94 test in accordance with standard ISO 1210.

Exudation: observed and recorded as yes or no (Y/N).

The results of the compositions according to the invention (examples 1 to 5) and of the compositions of the prior art (comparative examples CE1-CE9) are collated in table 1 below:

TABLE 1

| | | | | | EXAMPLES | | | | | | | | |
|---|---|---|---|---|---|---|---|---|---|---|---|---|---|
| | 1 | 2 | 3 | 4 | 5 | CE1 | CE2 | CE3 | CE4 | CE5 | CE6 | CE7 | CE8 |
| | | | | | | Process | | | | | | | |
| | t-screw | t-screw | t-screw | t-screw | t-screw | co-knead | co-knead | co-knead | co-knead | co-knead | co-knead | co-knead | co-knead |
| EVATANE 2403 | | | | 13.4 | | | | | | | | | |
| Lotryl 35BA40 | | | | | | 17.5 | | | | 18 | 18 | | |
| Lotryl 30BA02 | | | | | | | 18 | 18 | 18 | | | 16 | 14 |
| Lotader 8200 | | | | | | | | 21.6 | | | | | |
| Lotader 7500 | | | | | | | 21.6 | | | 21.6 | | 19.2 | 16.8 |
| Lotader 6200 | | | | | | 20.8 | | | 21.6 | | 21.6 | | |
| Lotader 3410 | 53.6 | 49.6 | 56 | 42.9 | 53.6 | | | | | | | | |
| PA6 | 13.4 | 12.4 | 14 | 10.7 | 13.4 | 5.2 | 5.4 | 5.4 | 5.4 | 5.4 | 5.4 | 4.8 | 4.2 |
| Exolit AP750 | 30 | 35 | 25 | 30 | | | | | | | | | |
| Budit 3167 | | | | | 30 | | | | | | | | |
| Magnitin H5KV | | | | | 55 | | | | | | | | |
| Magnifin H5 | | | | | | 55 | 55 | 55 | 55 | 55 | 55 | 60 | 65 |
| Phosphlex 31L | | | | | | | | | | | | | |
| Siliporite NK10AP | 2 | 2 | 2 | 2 | 2 | | | | | | | | |
| PER | | 2 | | | | | | | | | | | |
| Irganox 1098 | 0.5 | 0.5 | 0.5 | 0.5 | 0.5 | | | | | | | | |
| Irgafos 168 | 0.5 | 0.5 | 0.5 | 0.5 | 0.5 | | | | | | | | |
| Irganox 1010 | | | | | | 0.75 | | | | | | | |
| Stavinor CA PSE | | | | | | 0.75 | | | | | | | |
| MFI (220° C., 21.6 kg) | | | | | | 0.9 | | | | | | | |
| MFI (230° C., 21.6 kg) | 7.3 | 7.3 | 6.1 | 6.8 | | | | | | | | | |
| LOI (%) | 37.2 | 41.8 | | 39.1 | 38.4 | 28.6 | 28.1 | 28.1 | 28.7 | 28.1 | | 31.3 | 34.0 |
| UL94 classification | V1 | V0 | V0 | V0 | V0 | | | | | | | | |
| Flow (temperature) | | 110° C. | | 110° C. | 140° C. | <100° C. | <100° C. | <100° C. | <100° C. | <100° C. | <100° C. | <100° C. | <100° C. |
| Elongation at break (%) | 261 | 146 | | 448 | 321 | 64 | 50 | 45 | 19 | 16 | | 45 | 18 |
| Breaking stress (MPa) | 8.5 | 7.2 | | 10.7 | 9.8 | 7.9 | 9.3 | 9.3 | 7.4 | 8.3 | | 8.9 | 10 |

TABLE 1-continued

| | EXAMPLES | | | | | | | | | | | | |
|---|---|---|---|---|---|---|---|---|---|---|---|---|---|
| | 1 | 2 | 3 | 4 | 5 | CE1 | CE2 | CE3 | CE4 | CE5 | CE6 | CE7 | CE8 |
| | | | | | | | | Process | | | | | |
| | t-screw | t-screw | t-screw | t-screw | t-screw | co-knead | co-knead | co-knead | co-knead | co-knead | co-knead | co-knead | co-knead |
| Hardness (Shore D) | | 42 | | 40 | 42 | | | | | | | | |
| Exudation (Y/N) | N | N | N | N | N | N | N | N | N | N | N | N | N |

What is claimed is:

1. A flame-retarded flexible thermoplastic composition containing no halogen compound or phosphorous plasticizer, comprising a graft copolymer containing polyamide blocks and composed of a polyolefin backbone and on average at least one polyamide graft, in which the grafts are attached to the backbone by the radicals of an unsaturated monomer (X) having a function capable of reacting with an amine-terminal polyamide, the radicals of the unsaturated monomer (X) being fixed to the backbone by grafting or copolymerization from its double bond, wherein said composition comprises, in a mixture:
  50% to 70% by weight of the graft copolymer containing polyamide blocks,
  25% to 35% by weight of a flame retardant selected from ammonium phosphates, phosphinates, pyrophosphates, and polyphosphates,
  approximately 2% by weight of molecular sieve.

2. The composition as claimed in claim 1, wherein the polyolefin backbone containing (X) is selected from ethylene-maleic anhydride or ethylene-alkyl (meth)acrylate-maleic anhydride copolymers.

3. The composition as claimed in claim 1, wherein there are at least 1.3 moles of (X) attached to the polyolefin backbone.

4. The composition as claimed in claim 1, wherein the polyamide graft has a molar mass of between 1000 and 5000 g/mol.

5. The composition as claimed in claim 1, wherein the flame retardant is ammonium polyphosphate.

6. The composition as claimed in claim 1, wherein the molecular sieves are zeolites and said zeolites are 3A, 4A, 5A, 10X, or 13X zeolites.

7. The composition as claimed in claim 1, wherein the mixture further comprises one or more materials selected from the group consisting of melamine cyanurate and pentaerythritol.

8. The composition as claimed in claim 1, further comprising at least one copolymer of ethylene and a carboxylic acid or ethylenically unsaturated ester comonomer.

9. The flame-retarded thermoplastic composition as claimed in claim 1 comprising electrical cables, electrical components, connectors, or molding cases in electrical engineering.

10. The flame-retarded thermoplastic composition as claimed in claim 9, for manufacturing protective layers or thermal protection sleeves for automotive fluid transfer lines.

11. A flame-retarded flexible thermoplastic composition based on functionalized polyolefins grafted with polyamide units, containing at least one flame retardant, based on ammonium polyphosphates and a zeolite, and containing no halogen compounds, phosphorus plasticizer or red phosphorus.

12. The composition of claim 11, wherein functionalized polyolefins are selected from ethylene-maleic anhydride or ethylene-alkyl (meth)acrylate-maleic anhydride copolymers.

13. The composition of claim 12, wherein there are at least 1.3 moles of maleic anhydride attached to the functionalized polyolefins.

14. The composition as claimed in claim 11, wherein the polyamide units have a molar mass of between 1000 and 5000 g/mol.

15. The composition as claimed in claim 11, wherein the zeolites are 3A, 4A, 5A, 10X, or 13X zeolites.

16. The composition as claimed claim 11, wherein the composition further comprises one or more materials selected from the group consisting of melamine cyanurate and pentaerythritol.

17. The composition as claimed in claim 1 wherein said molecular sieves comprise zeolites, hydrotalcite(s), or mixtures thereof.

18. The composition as claimed in claim 14, wherein the polyamide units have a molar mass of between 2000 and 3000 g/mol.

* * * * *